(12) United States Patent
Hahn et al.

(10) Patent No.: US 9,317,204 B2
(45) Date of Patent: Apr. 19, 2016

(54) SYSTEM AND METHOD FOR I/O OPTIMIZATION IN A MULTI-QUEUED ENVIRONMENT

(71) Applicants: Judah Gamliel Hahn, Ofra (IL); Joseph Meza, Aliso Viejo, CA (US); Vered Kelner, Gan Haim (IL); Nicholas Thomas, Dundee (GB); Barry Wright, Edinburgh (GB)

(72) Inventors: Judah Gamliel Hahn, Ofra (IL); Joseph Meza, Aliso Viejo, CA (US); Vered Kelner, Gan Haim (IL); Nicholas Thomas, Dundee (GB); Barry Wright, Edinburgh (GB)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 14/189,785

(22) Filed: Feb. 25, 2014

(65) Prior Publication Data
US 2015/0134857 A1     May 14, 2015

Related U.S. Application Data

(60) Provisional application No. 61/904,392, filed on Nov. 14, 2013.

(51) Int. Cl.
    *G06F 3/00*             (2006.01)
    *G06F 3/06*             (2006.01)
    *H04L 12/861*         (2013.01)

(52) U.S. Cl.
    CPC .............. *G06F 3/061* (2013.01); *G06F 3/0659* (2013.01); *G06F 3/0679* (2013.01); *H04L 49/90* (2013.01)

(58) Field of Classification Search
CPC ..... G06F 3/0659; G06F 3/061; G06F 3/0679; H04L 49/90
USPC ....................................... 710/310, 5
See application file for complete search history.

(56) References Cited

U.S. PATENT DOCUMENTS

2014/0047155 A1*    2/2014    Zheng et al. .................. 710/310
2014/0281329 A1*    9/2014    McKean et al. ............... 711/167

OTHER PUBLICATIONS

"NVM Express", printed from the internet at http://en.wikipedia.org/wiki/NVM_Express, dated Nov. 6, 2013, 4 pages.
"CFS Scheduler", printed from the internet at http://www.kernel.org/doc.Documentation/scheduler/sched-design-CFS.txt, dated Nov. 6, 2013, 5 pages.
Intel Corporation, "NVM Express", Revision 1.1a, dated Sep. 23, 2013, 166 pages.

* cited by examiner

*Primary Examiner* — Ernest Unelus
(74) *Attorney, Agent, or Firm* — Brinks Gilson & Lione

(57) ABSTRACT

A system and method for I/O optimization in a multi-queued environment are provided. In one embodiment, a host is provided that sorts commands into a plurality of queues, wherein a command is sorted based on its data characteristic. The host receives a read request from a storage module for commands in the plurality of queues and provides the storage module with the requested commands. In another embodiment, a storage module is provided that processes commands from a host based on the data characteristic of the queue that stored the command on the host. In another embodiment, a storage module sorts command completions into a plurality of queues, wherein a command completion is sorted based on its resulting status code.

30 Claims, 14 Drawing Sheets

US 9,317,204 B2

SYSTEM AND METHOD FOR I/O OPTIMIZATION IN A MULTI-QUEUED ENVIRONMENT

CROSS-REFERENCE TO RELATED APPLICATION

This application claims the benefit of U.S. Provisional Patent Application No. 61/904,392, filed Nov. 14, 2013, which is hereby incorporated by reference.

BACKGROUND

Storage modules, such as solid state drives (SSDs), typically use generalized models to determine optimized write and read patterns by hosts. When the host behavior matches these expected patterns, the best level of performance, endurance, and power consumption is exhibited by the storage module. However, hosts do not always behave in the manner that storage module vendors expect. While a host may "know" its read/write pattern in advance, there are few ways in which it can express this pattern to a storage module. Storage modules that can adapt their storage algorithms to actual rather than expected host behavior will see improved synergy with the host, resulting in better performance, endurance, and/or power consumption, as desired.

The Non-Volatile Memory Express (NVMe) specification presents an additional dimension to this quandary. In NVMe, storage modules may expose multiple independent queues to a host, allowing the host to send many operations at once to different queues of a single storage module. Rather than a single pipeline of requests which may be optimized, each thread in a host may potentially send out its own command sequences to different queues, which may not appear to match the patterns expected (and optimized for) by the storage module.

In an attempt to improve the host to storage module synergy, NVMe and Advanced Host Controller Interface (AHCI) specifications include Data Set Management (DSM) commands and parameters which allows a host to hint to the storage module that various logical block address (LBA) ranges that are going to be used in a certain way. The storage module may then identify specific requests by their LBA ranges and optimize accordingly. The issue with DSM is that its LBA-range centric nature requires additional bookkeeping by both the host and the storage module. Since hosts typically use files rather than fixed partitions for different types of requests, a "random write 50%" range may overlap and mix with a "write once" range, creating complex lists of which LBA corresponds to which hint. The overhead of managing and mapping these hints may be greater than the benefit received by using them.

OVERVIEW

Embodiments of the present invention are defined by the claims, and nothing in this section should be taken as a limitation on those claims.

By way of introduction, the below embodiments relate to a system and method for I/O optimization in a multi-queued environment. In one embodiment, a host is provided that sorts commands into a plurality of queues, wherein a command is sorted based on its data characteristic. The host receives a read request from a storage module for commands in the plurality of queues and provides the storage module with the requested commands. In another embodiment, a storage module is provided that processes commands from a host based on the data characteristic of the queue that stored the command on the host. In another embodiment, a storage module sorts command completions into a plurality of queues, wherein a command completion is sorted based on its resulting status code.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Introduction

The following embodiments can be used to for input/output (I/O) optimization in a multi-queued environment. Before turning to these and other embodiments, the following paragraphs provide a discussion of exemplary host and storage modules that can be used with these embodiments. Of course, these are just examples, and other suitable types of storage modules can be used.

Exemplary Host and Storage Modules

Figure 1:
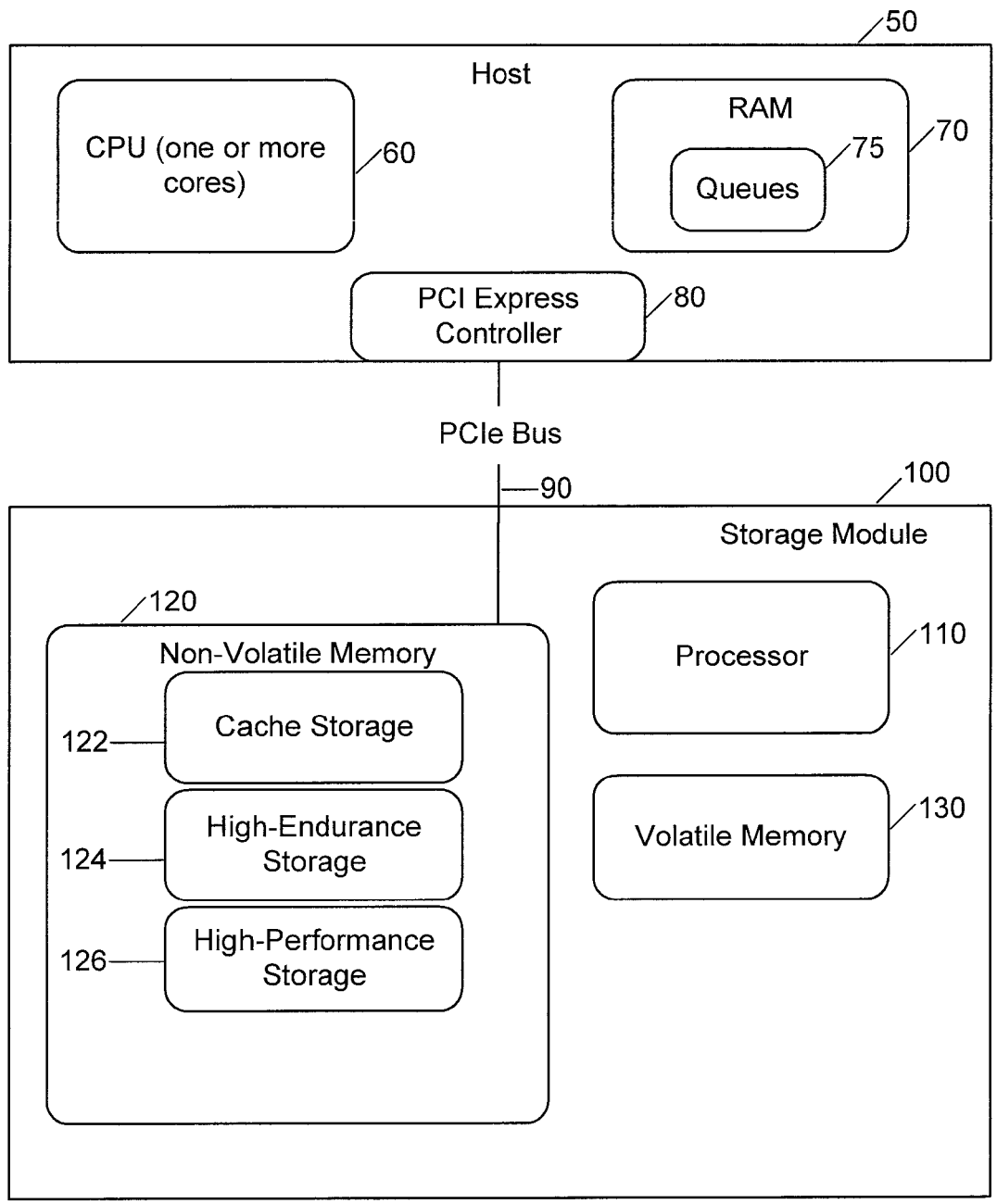
FIG. 1 is a block diagram of an exemplary host and storage module of an embodiment.

FIG. 1 shows an exemplary host 50 and storage module 100 of an embodiment. The host 50 can take any form, such as, but not limited to, a computer (e.g., a laptop, desktop, or notebook computer), a server, a tablet, a mobile phone, a digital media player, a game device, a personal digital assistant (PDA), or a book reader. Of course, other types of hosts 50, now existing or later developed, can be used.

As illustrated in FIG. 1, the host 50 in this embodiment comprise one or more processors 60, random access memory 70 (which can store a plurality of command queues 75, which will be discussed in more detail below), and a host controller 80 for communicating with a storage module 100. In this embodiment, the host controller 80 takes the form of a Peripheral Component Interconnect (PCI) Express controller. However, it should be understood that other types of controller can be used in other implementations. The host 50 is in communication with the storage module 100 via a bus 90. As used herein, the phrase "in communication with" could mean directly in communication with or indirectly in communication with through one or more components, which may or may not be shown or described herein. In this embodiment, the bus 90 takes the form of a PCIe bus, but, in other embodiments, other types of buses can be used. The host 50 can include other components, which are not shown in FIG. 1 to simplify the drawing. For example, if the host 50 is a computer, the host 50 can include other processing and peripheral components well known to a computer (e.g., user input devices, network connectivity ports, a power supply, video and audio outputs, etc.). If the host 50 is a mobile phone, for example, the other components can include hardware and/or software components to make and place telephone calls. Of course, these are just some examples, and other implementations can be used.

FIG. 1 also illustrates the storage module 100 of an embodiment. The storage module 100 can take any suitable form, such as a solid state drive (SSD) this is embedded in or removably connectable to the host 50. Other examples of the storage module 100 include, but are not limited to, a handheld, removable memory device, such as a Secure Digital (SD) memory card, a microSD memory card, a Compact Flash (CF) memory card, or a universal serial bus (USB) device. Of course, other types of storage modules 100, now existing or later developed, can be used. The storage module 100 can be an enterprise or client/consumer storage device.

As shown in FIG. 1, the storage module 100 in the embodiment includes a processor 110, non-volatile memory 120, and volatile memory 130. The processor 110 can be implemented in any suitable manner and can take the form of, for example, a general processor, an application specific integrated circuit (ASIC), a programmable logic controller, logic gates, and/or switches (the terms "processor" and "controller" are used interchangibly herein). The following embodiments describe the processor 110 as being configured to perform certain functions. It should be understood that those functions can be hard-wired into the processor 110 or the processor 110 can be capable of reading computer-readable program code (e.g., software or firmware) from a computer-readable medium (e.g., the non-volatile memory 120 or other memory (not shown) to execute those functions. The non-volatile memory 120 can store data from the host 50 (and other entities) and can take any suitable form. For example, in one embodiment, the non-volatile memory 120 takes the form of a solid-state (e.g., NAND flash) memory and can be one-time programmable, few-time programmable, or many-time programmable. The non-volatile memory 120 can also use single-level cell (SLC), multiple-level cell (MLC), triple-level cell (TLC), or other memory technologies, now known or later developed. In this embodiment, the non-volatile memory can have three different memory areas: a cache storage area 122, a high-endurance storage area 124, and a high-performance storage area 126. These can be three different areas in the same physical memory, or one or more of these can be different storage devices. Also, in other embodiments, fewer (or just one) or more memory areas can be used. The volatile memory 130 can also take any suitable form (including SRAM and DDR) and can be used as a random access memory (RAM). There may also be multiple forms of volatile memory in the same device (e.g., SRAM and DDR).

Figure 2A:
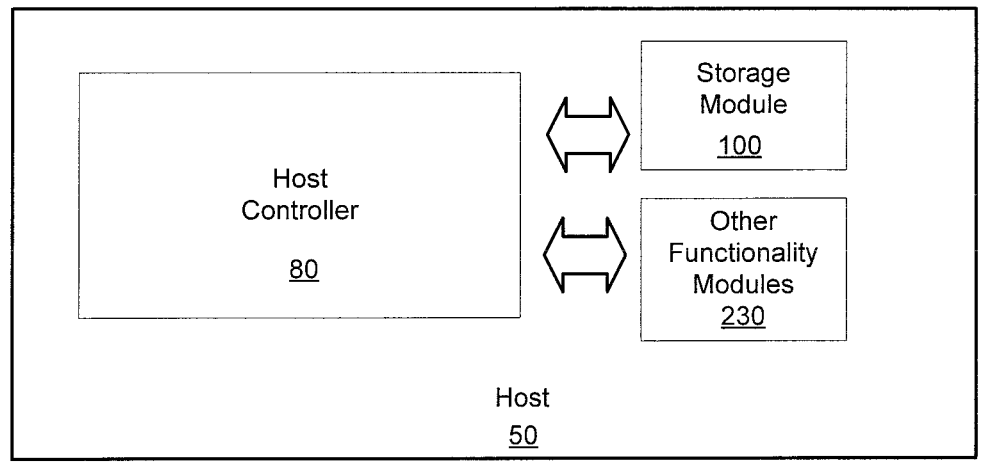
FIG. 2A is a block diagram of a host of an embodiment, in which the storage module is embedded in the host.
Figure 2B:
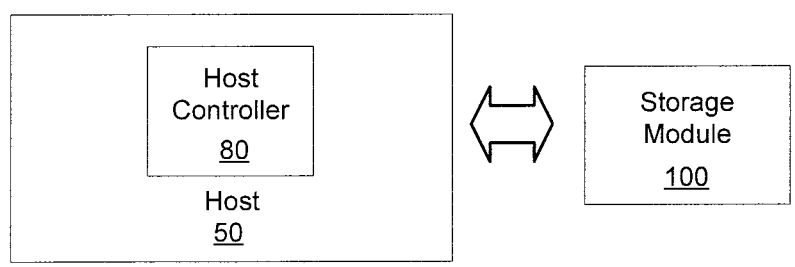
FIG. 2B is a block diagram of a host of an embodiment, in which the storage module is a separable, removable device.

As mentioned above, the storage module 100 and be embedded in or separate from the host 50. These different configurations are shown in FIGS. 2A and 2B. As shown in FIG. 2A, the storage module 100 can be embedded in a host 50 having a host controller 80. That is, the host 50 embodies the host controller 80 and the storage module 100, such that the host controller 80 interfaces with the embedded storage module 100 to manage its operations. For example, the storage module 100 can take the form of an embedded (flash) solid state drive. The host controller 80 can interface with the embedded storage module 100 using, for example, a PCIe interface. In other embodiments, other interfaces can be used, such as, but not limited to, an eMMC host interface or a UFS interface. As shown in FIG. 2A, the host 50 can include optional other functionality modules 230, which can include some of the optional components discussed above. As shown in FIG. 2B, instead of being an embedded device in the host 50, the storage module 100 can have physical and electrical connectors that allow the storage module 100 to be removably connected to the host 50 via mating connectors. As such, the storage module 100 is a separate device from (and is not embedded in) the host 50.

Input/Output (I/O) Optimization in a Multi-Queued Environment

Some specifications use multiple independent queues to present commands from a host to a storage module. One such specification is the Non-Volatile Memory Express (NVMe) specification, which defines a register level interface and shared memory structures that allows a host to communicate with a non-volatile memory storage module. NVMe is optimized for enterprise and client solid state drives attached to the host with a PCI Express interface. The shared memory structures defined in NVMe are the input-output queues and are called admin submission queue (ASQ), admin completion queue (ACQ), submission queues (SQ) and completion queues (CQ). In one embodiment, these shared memory structures are physically present in the host; however, in other embodiments, one or more of these shared memory structures can be stored in the storage module or in another device. While the following paragraphs will describe an example of an embodiment in terms of these queues, it should be noted that other types of input-output queues can be used and that specifications other than NVMe can be used. Thus, a specific type of queue or specification should not be read into the claims unless expressly recited therein.

Figure 3:
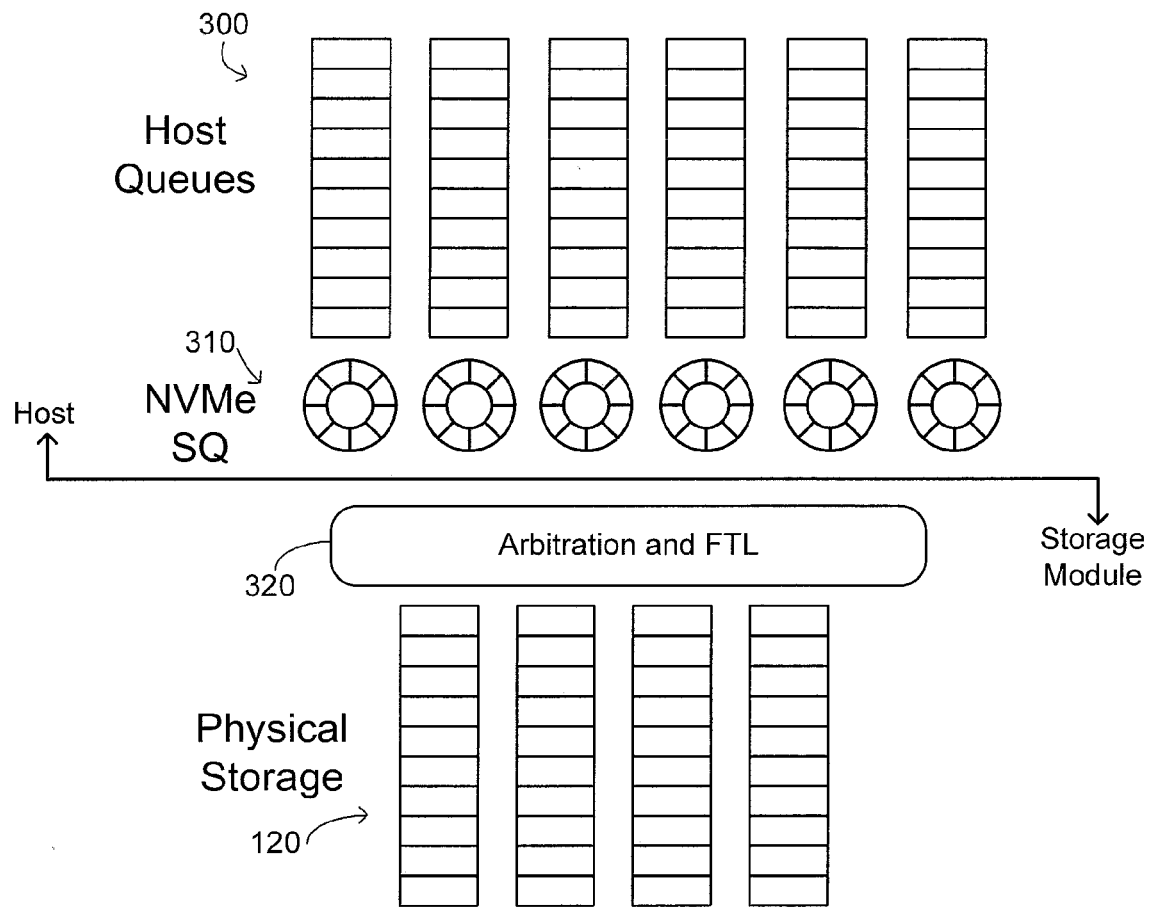
FIG. 3 is a block diagram that illustrates the use of a submission queue in a NVMe environment of an embodiment.

FIG. 3 is a block diagram that illustrates the use of submission queues in a NVMe environment of an embodiment. As shown in FIG. 3, the host 50 contains a set of six host queues (that is, I/O queues fully managed and maintained within the host operating system and used to queues I/O requests within the operating system kernel) and a set of six submission queues (SQ), which may or may not directly correspond to host queues (although there is a one-to-one correspondence between host and submission queues shown in FIG. 3, in other embodiments, there may be more or fewer host queues than submission queues). (For example, host queues might not be separated by data set characteristics, but the submission queues may be separated in that manner.) Each of the segments in the queues represents a command to be performed by the storage module 100. In this example, each of the host queues 300 can hold ten commands, while each of the six submission queues (SQ) can only hold eight 8 commands. These numbers were chosen here for ease of illustration, and it should be understood that the number of queues and/or commands per queue can vary. The host 50 is responsible for determining which commands (e.g., from one or more core processors on the host 50) go into which of the host queues 300 and then which subset of commands from a given host queue should be placed in the corresponding submission queue (SQ). The submission queue (SQ) is a circular buffer with a fixed slot size that the host 50 uses to submit commands selected from the corresponding host queue for execution by the controller. Head and tail pointers are used to inform the storage module 100 of the start and end of the commands in the submission queue (SQ). In this way, while the storage module 100 processes commands from a certain portion of the submission queue (SQ), the host 50 can be populating other portions of the submission queue (SQ) with commands to be executed in the future. While the commands in the host and submission queues (SQ) are typically from applications running on the host 50, the host 50 can also have an admin submission queue (ASQ), which is similar to a submission queue (SQ) but is used to submit administrative commands to the storage module 100.

In NVMe, the host 50 uses a doorbell register to inform the storage module 100 that there are commands to be read from the submission queue (SQ). The storage module 100 then requests the commands from the host 50, and the host 50 provides the commands to the storage module 100 for execution. After the storage module 100 executes a command, it places information about the completion of the commands in a completion queue (CQ) (not shown) that is also stored in the host 50.

The storage module 100 fetches the commands in order from the submission queues (SQ) but can execute those commands in any order. This process of determining the order of command execution is known as "arbitration" in NVMe. Various arbitration mechanisms are set forth in the NVMe specification, such as round robin arbitration (where all submission queues (SQ) are treated with equal priority) and weighted round robin arbitration with urgent priority (where priority is given to certain submission queues (SQ) over others). The NVMe specification also allows for vendor-specific arbitration but states that the mechanisms for vendor-specific arbitration are outside the scope of the specification. After the commands are selected through the arbitration process, the storage module's flash translation layer translates the LBA addresses in the commands to the physical addresses of the memory 120. This process of arbitration and FTL processing is generally denoted by box 320 in FIG. 3.

As discussed in the background section above, for the best level of performance, endurance, and power consumption, it is desired for the storage module 100 to perform certain patterns of write and read operations. NVMe includes a Data Set Management (DSM) specification that allows the host 50 to hint to the storage module 100 that various logical block address (LBA) ranges are going to be used in a certain way. The storage module 100 can then identify specific commands by their LBA ranges and optimize accordingly. The issue with DSM is that its LBA-range centric nature requires additional bookkeeping by both the host and the storage module. Since hosts typically use files rather than fixed partitions for different types of requests, a "random write 50%" range may overlap and mix with a "write once" range, creating complex lists of that LBA corresponds to which hint. The overhead of managing and mapping these hints may be greater than the benefit received by using them. Given this complexity, host operating systems do not typically send these hints to storage modules.

Figure 4:
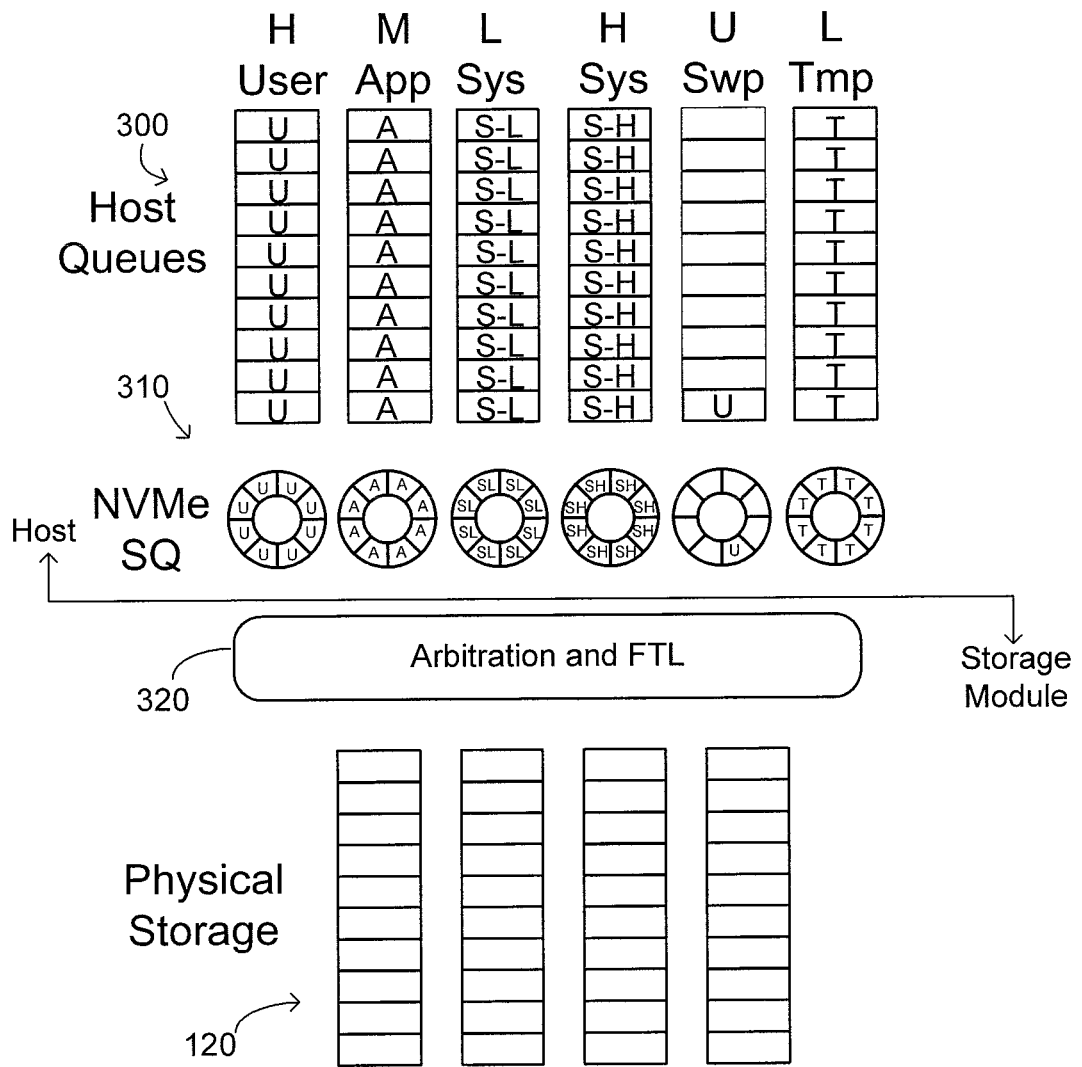
FIG. 4 is a block diagram that illustrates the use of a submission queue of an embodiment when commands are sorted into the queues based on data characteristics.

In this embodiment, host 50 addresses this problem by sorting commands into the host queues based on certain data characteristics with expected write and read patterns, and the storage module 100 services commands based on what submission queue (SQ) their from (the storage module's 100 role in this embodiment will be discussed further below). As used herein, "data characteristic" refers to an attribute of the data contained in the payload that, if known to the storage module, would aid in determining the optimal storage strategy for the data. Examples of "data characteristics" of a command include, but are not limited to, sequential access, infrequently-accessed data write, temporary data write, random reads, priority read, and priority write. For example, instead of the six submission queues (SQ) being generic queues as in FIG. 3, FIG. 4 shows that each of the six submission queues (SQ) are dedicated to commands of a certain data characteristic: high-priority user data, medium-priority application data, low-priority system data, high-priority system data, urgent-priority swap data, and low-priority temporary data. (How the storage device 100 deals with these different queues will be described below.)

In another example, the host 50 may designate specific queues for synchronous and asynchronous commands and may further subdivide them for read and write commands, such that the following queues are created:

| | |
|---|---|
| Synchronous Read (Urgent Priority) | Synchronous Write (High Priority) |
| Asynchronous Read (Medium/Low Priority) | Asynchronous Write (Low Priority) |

"Synchronous read" in this context refers to a read command that affects user experience or otherwise stalls overall system activity. These reads preferably are completed by the storage module 100 as quickly as possible, even at the expense of other commands. (NVMe storage modules are not required to complete submitted commands in a specific order. It is the responsibility of the host 50 to ensure synchronicity between reads and writes.) "Synchronous writes" include writes to file system metadata or journal checkpoints, which may be followed by a flush or marked with a Force Unit Access (FUA) flag, indicating that they should not return until completely committed to flash. In general, a synchronous write is any write where buffering is disabled. For example, benchmark applications typically issue synchronous writes to measure device performance. In normal use, virtually all writes are asynchronous except as described above.

In yet another example, if the storage module 100 makes nine submission queues and one administrative submission queue ("9+1" submission queues) available to the host 50 and these queues are driven by priority, the host 50 may designate the queues in the following manner (when referring to queues in the 9+1 concept, the queues are referred to using their position in the table, as follows: 1H—Application Images/Library Cache, 1M—Application Resources, . . . , 3L—Log output and event data):

| | Static (1) | User Data (2) | Transient Data and Greedy Data (3) |
|---|---|---|---|
| High | Application Images and Library Cache | Demand-loaded user data | Boot, Hibernate and Swap |

|  | Static (1) | User Data (2) | Transient Data and Greedy Data (3) |
| --- | --- | --- | --- |
| Medium | Application Resources | Autosaved and versioned data | Temporary Files |
| Low | Application Prefetch | Prefetched user data | Log output and event data |

As yet another example, the host 50 may sort large reads and writes into separate queues and smaller ones into other queues. Similarly, the host 50 may sort sequential I/O patterns into a specific queue and random access patterns into other queues.

Figure 5:
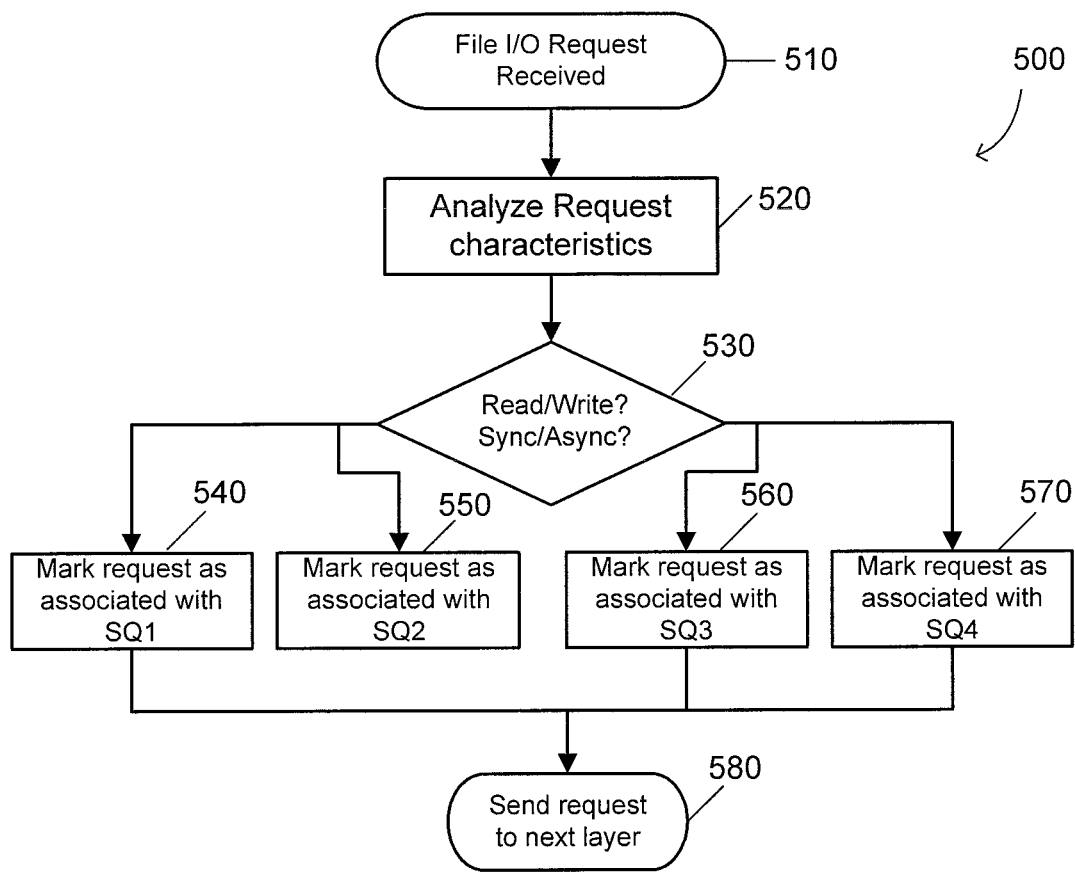
FIG. 5 is a flow chart of an embodiment for sorting commands into queues based the read/write, synchronous/asynchronous characteristic of a file I/O request.
Figure 6:
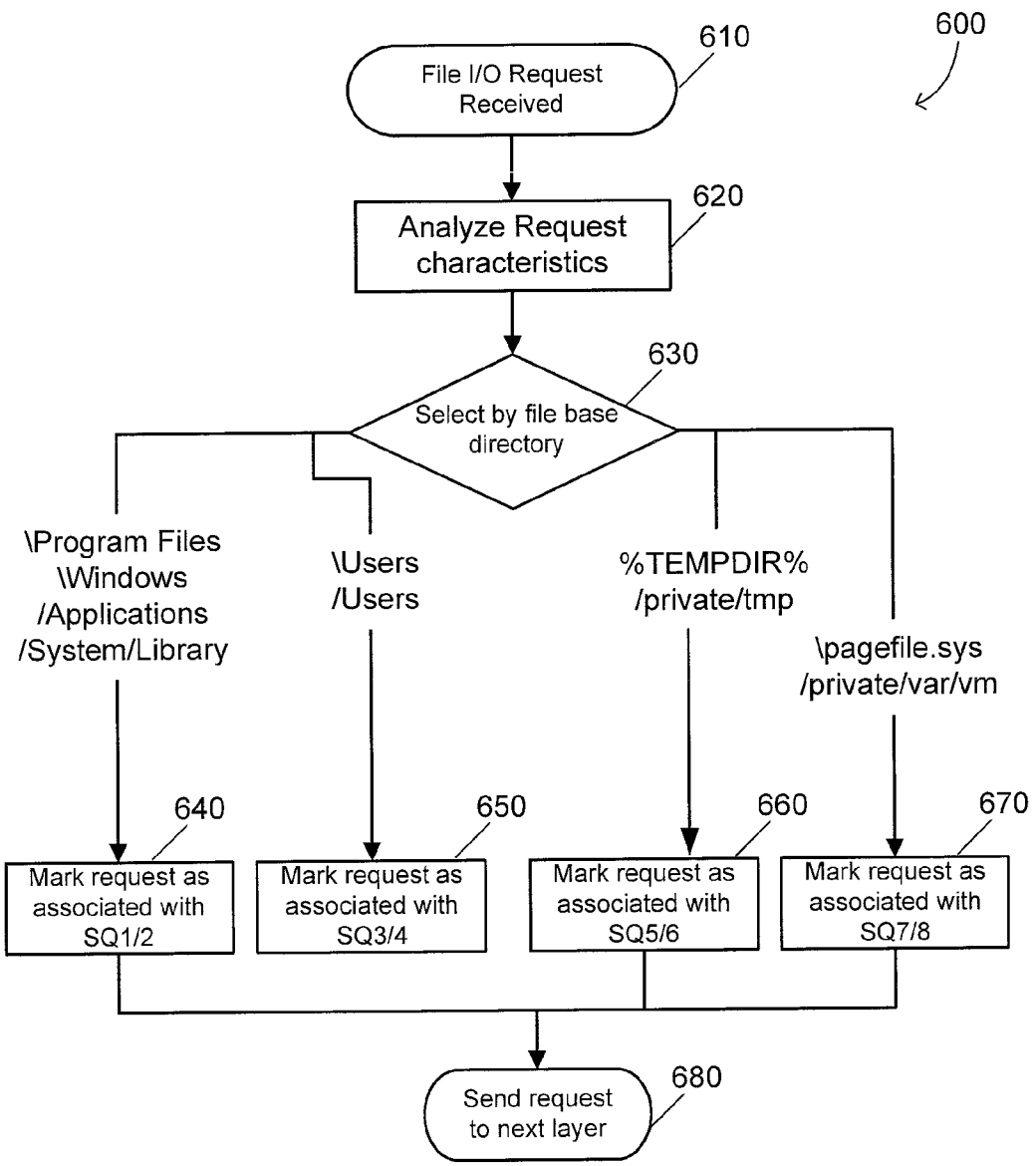
FIG. 6 is a flow chart of an embodiment for sorting commands into queues based on a file base directory characteristic of a file I/O request.
Figure 7:
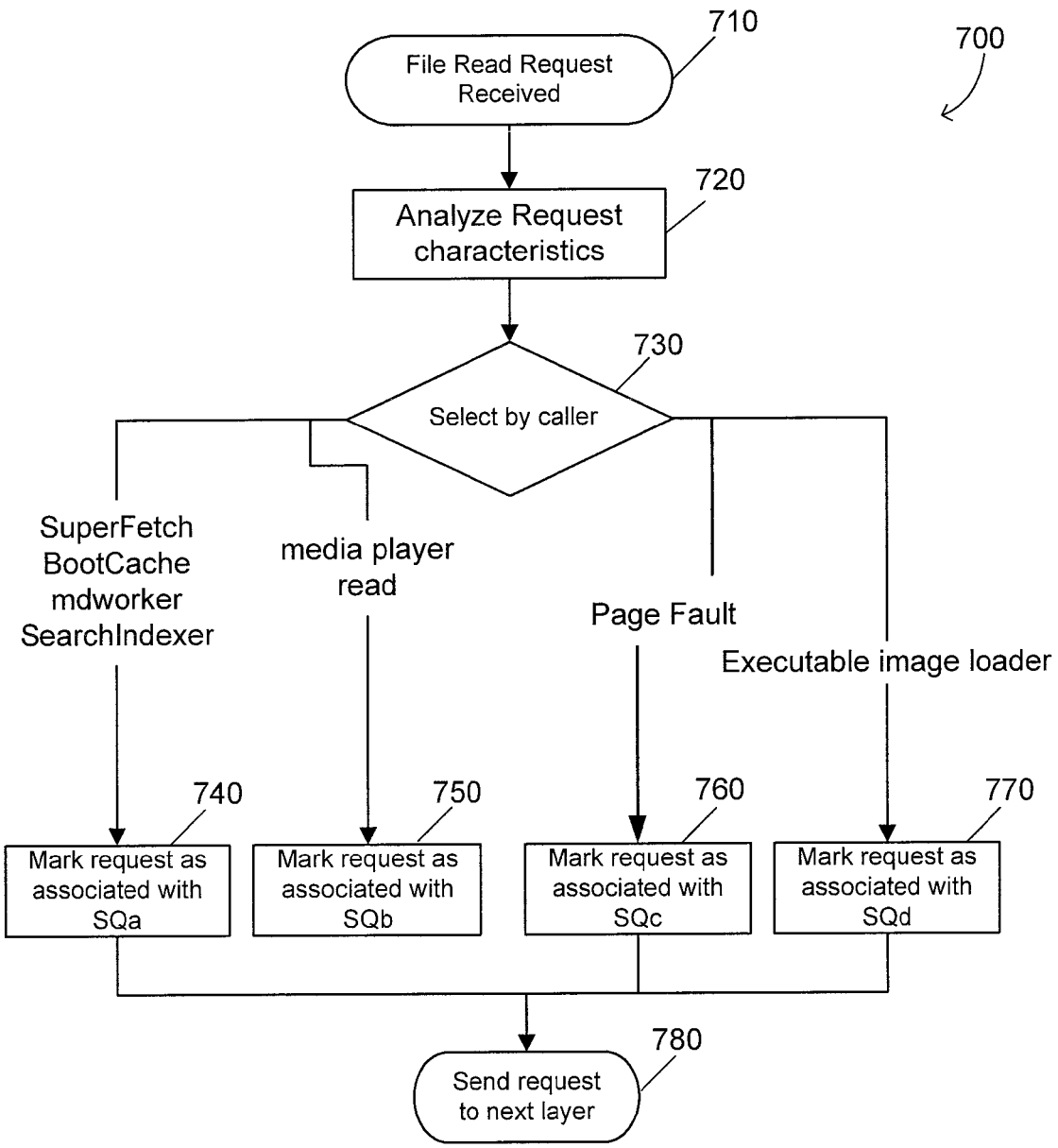
FIG. 7 is a flow chart of an embodiment for sorting commands into queues based on the caller of a read request.

The host 50 can use any suitable method for sorting commands into queues based on a command's data characteristic. FIGS. 5-7 illustration some exemplary sorting methods. FIG. 5 is a flow chart 500 of an embodiment for sorting commands into queues based the read/write, synchronous/asynchronous characteristic of a file I/O request. As shown in FIG. 5, a file I/O request is received (act 510), and the request's characteristics are analyzed (act 520). It is determined whether the command is a read or write command and whether the command is a synchronous command or an asynchronous command (act 530). If the command is a synchronous read command, it is marked as being associated with submission queue (SQ) 1, which is the queue for synchronous read (urgent priority) commands (act 540). If the command is an asynchronous read command, it is marked as being associated with submission queue (SQ) 2, which is the queue for synchronous write (high priority) commands (act 550). If the command is a synchronous write command, it is marked as being associated with submission queue (SQ) 3, which is the queue for synchronous write (high priority) commands (act 560). If the command is an asynchronous write command, it is marked as being associated with submission queue (SQ) 4, which is the queue for asynchronous write (medium priority) commands (act 570). The request is then sent to the next layer in the stack (act 580).

FIG. 6 is a flow chart 600 of an embodiment for sorting commands into queues based on a file base directory characteristic of a file I/O request. As shown in FIG. 6, a file I/O request is received (act 610), and the request's characteristics are analyzed (act 620). It is determined which file base directory is associated with the command (act 630). If the command is associated with the \Program Files, \Windows, /Applications, or /System/Library directory (depending on host operating system semantics), the command is marked as being associated with submission queues (SQ) 1 and 2, which are the queues for system read/write (frequent read, very rare write, medium priority) (act 640). If the command is associated with the Users directory, the command is marked as being associated with submission queues (SQ) 3 and 4, which are the queues for user data (frequent random read/write, variable priority) (act 650). If the command is associated with the operating system native temporary directory (which may be signified by %TEMPDIR% variable, or the target location of the /tmp directory or symbolic link), the command is marked as being associated with submission queues (SQ) 5 and 6, which are the queues for temporary data (write prepare, frequent random read/write/trim, low retention) (act 660). If the command is associated with the location of the system swap file (which may be the pagefile.sys file in the boot drive root directory, or the /private/var/vm directory depending on operating system semantics), the command is marked as being associated with submission queues (SQ) 7 and 8, which are the queues for synchronous read/write, high/urgent priority (act 670). The request is then sent to the next layer in the stack (act 680).

FIG. 7 is a flow chart 700 of an embodiment for sorting commands into queues based on the caller of a read request. As shown in FIG. 7, a read request is received (act 710), and the request's characteristics are analyzed (act 720). It is determined who the called was of the read request (act 730). If the caller's process name is one of the following: "SuperFetch", "BootCache", "mdworker", "SearchIndexer" (depending on the host operating system), the command is marked as being associated with submission queues (SQ) a, which is the queue for prefetched/indexing read (low priority, do not prefetch on storage module) (act 740). If the caller was a media player read, the command is marked as being associated with submission queues (SQ) b, which is the queue for fixed stream read (previously sequentially written) at high priority (act 750). If the caller was a page fault, the command is marked as being associated with submission queues (SQ) c, which is the queue for synchronous read (urgent priority) (act 760). If the caller was an executable image loader, the command is marked as being associated with submission queues (SQ) d, which is the queue for medium priority read (act 770). The request is then sent to the next layer in the stack (act 780).

Figure 8:
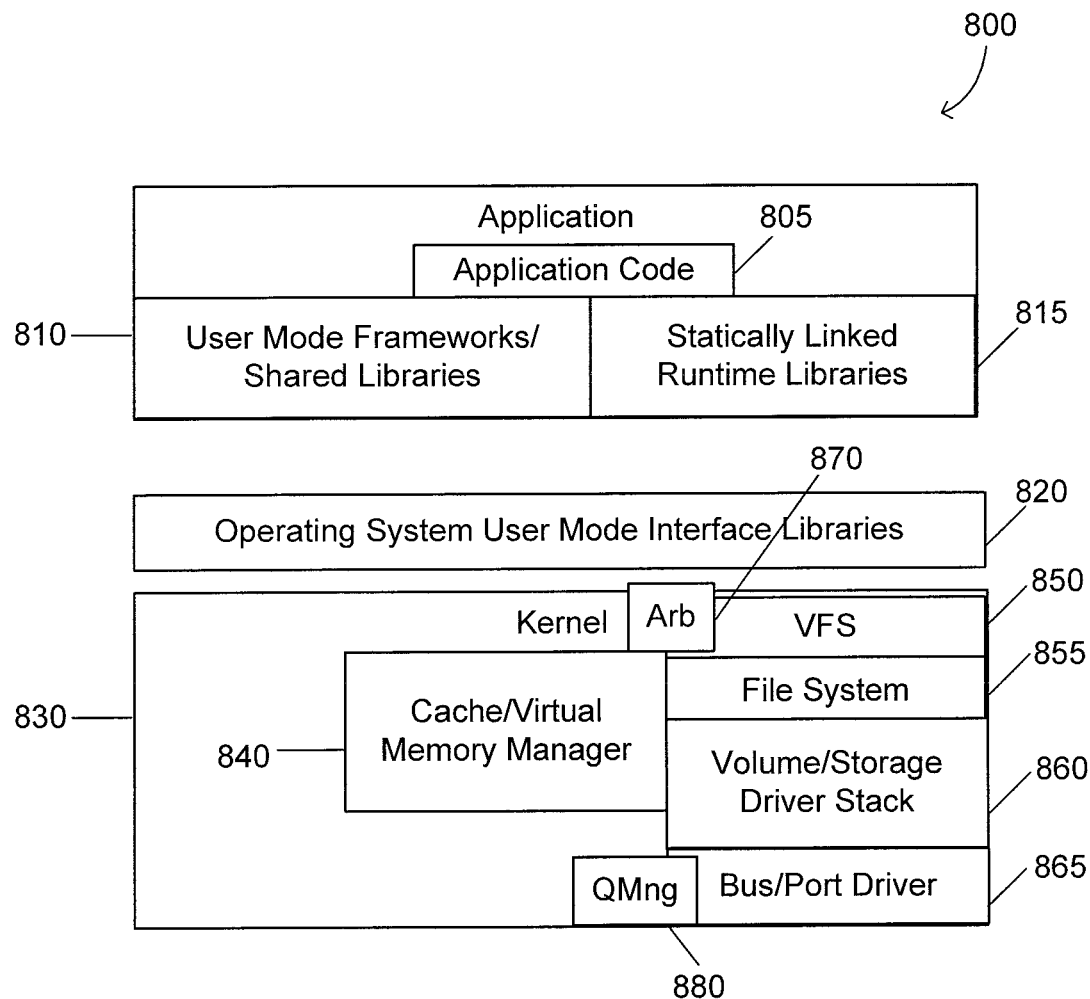
FIG. 8 is a block diagram of an exemplary host software stack of an embodiment.
Figure 9:
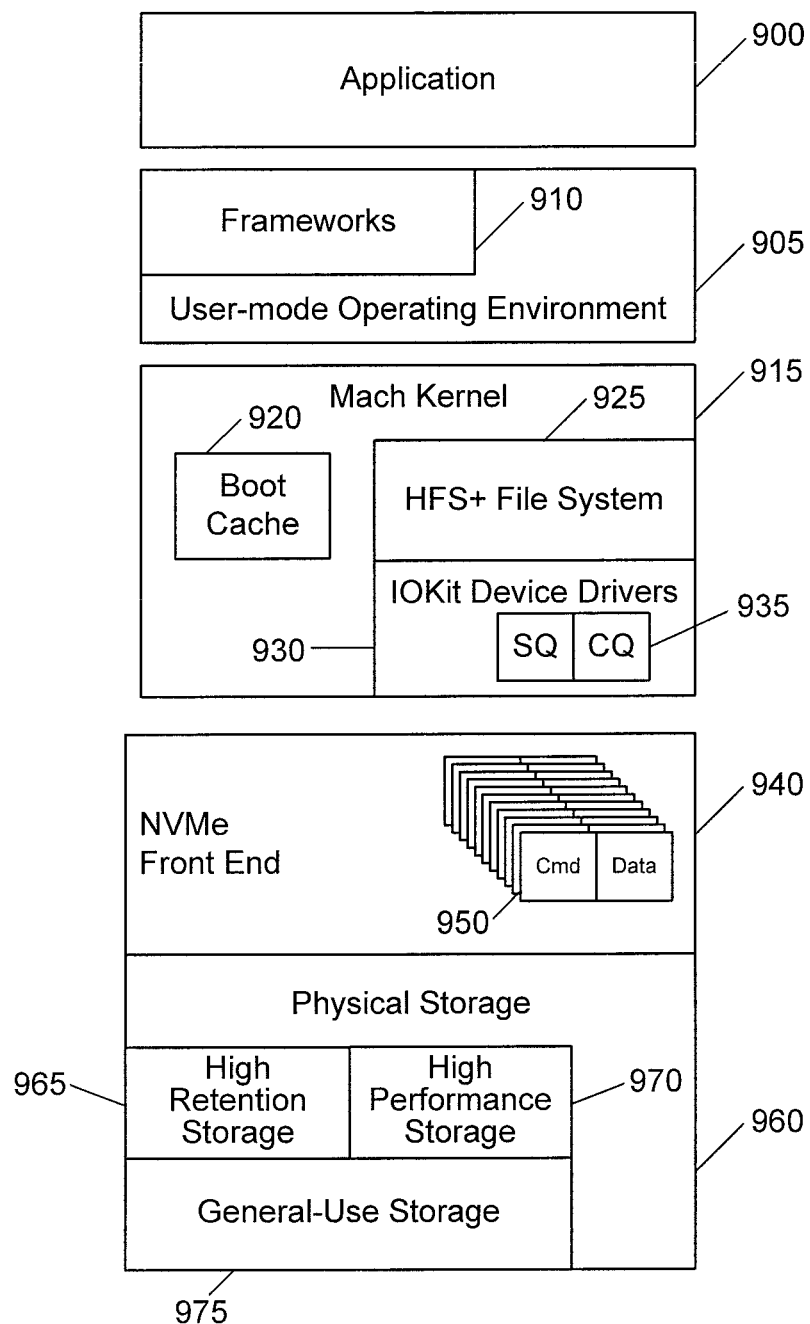
FIG. 9 is a diagram of a host architecture of an embodiment for the Mac operating system.
Figure 10:
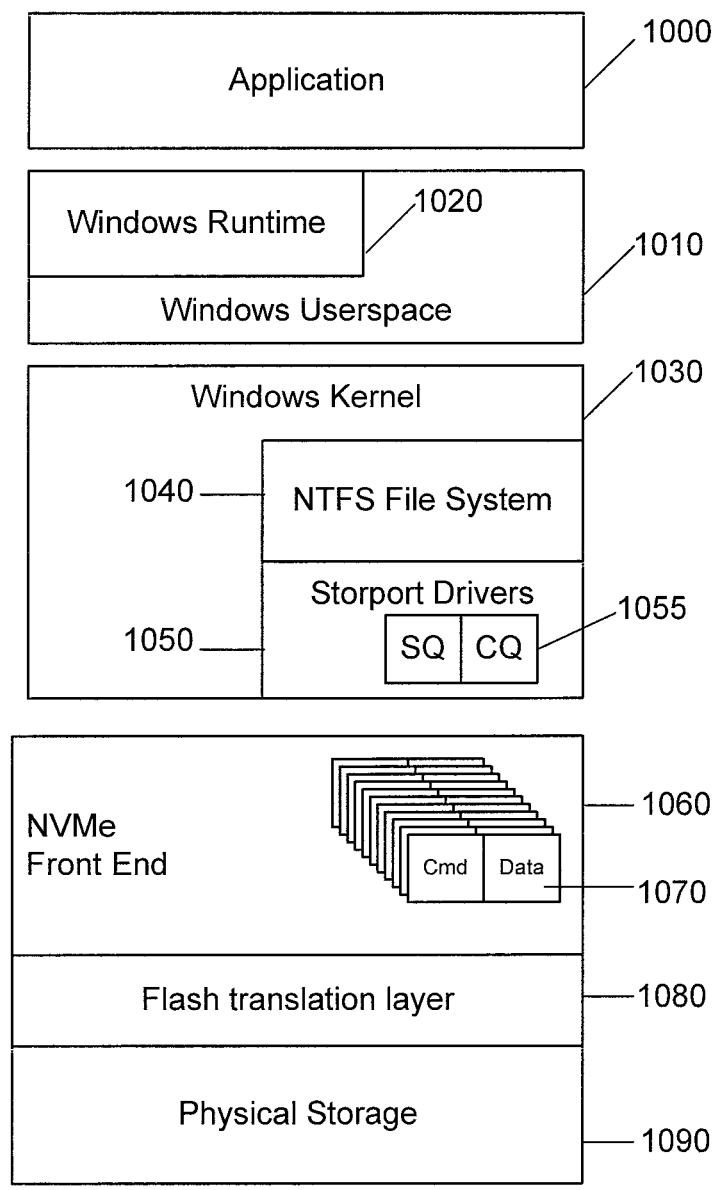
FIG. 10 is a diagram of a host architecture of an embodiment for the Windows operating system.

These methods can be performed by the controller of the host 50, and some exemplary architectures are shown in FIG. 8-10. FIG. 8 is a block diagram of an exemplary host software stack of an embodiment. As shown in FIG. 8, there is an application stack 800 with application code 805, user mode frameworks/shared libraries 810 and statically linked runtime libraries 815. The application stack 800 can be the source of commands that are sorted using the methods discussed above. The host software stack also has operating system user mode interface libraries 820 and a kernel 830. The kernel 830 has a cache/virtual memory manager 840, a virtual file system 850, a file system 855, a volume/storage driver stack 860, and a bus/port driver 865. The components so far are found in conventional host software stacks and operate as known in the art. However, in this embodiment, the host software stack also contains an arbiter 860, whose job it is to sort commands into the appropriate host queues 300 (see FIG. 4) and a queue manager (QMng) 880, whose job it is to select various commands from the host queues 300 and place them in the appropriate submission queues 310.

The host software stack can be implemented with any suitable operating system, and FIGS. 9 and 10 are diagrams showing implementation in the Mac and Windows operating systems, respectively. In should be understood that these embodiments can be used with Windows and Mac OS hosts, as well as with other operating system, now available or later developed. Turning first to FIG. 9, the Mac architecture comprises an application layer 900, an user-mode operating environment with frameworks 910, and a Mach kernel 915 with a boot cache 920, and HFS+ file system 925, and IOKit device drivers 930. The IOKit device drivers 930 contain the submission and completion queues 935. On the storage module side, there is an NVMe front end 940 with commands and data 950 read from or to be written to the submission and completion queues. The storage module also has physical storage 960, which, in this example, contains a high-retention storage area 965, a high-performance storage area 970, and a general-use storage area 975. In other embodiments, fewer or more storage areas can be used.

FIG. 10 shows an exemplary Windows architecture. This architecture has an application layer 1000, a Windows user-space 1010 with a Windows runtime component 1020, and a Windows Kernel 1030 with an NTFS file system 1040 and storport drivers 1050. The storport drivers 1050 contain the submission and completion queues 1055. On the storage module side, there is an NVMe front end 1040 with commands and data 1050 read from or to be written to the submission and completion queues. The storage module also has a flash translation layer 1080 and physical storage 1090.

Turning now to the storage module 100, the storage module 100 can be aware of the designations of the various submission queues based on a static mapping mechanism or a dynamic mapping mechanism, in which host "hints" can be easily communicated to and used by the storage module 100. For example, by populating a queue with read or write commands that include DSM attributes indicating an Access Frequency of Speculative Read, the host indicates to the device that the queue is used for prefetch operations.

The host 50 can also add vendor-specific flags to the queues that characterize the queues as possessing one of the attributes described above. For example, the host 50 can mark a specific queue as possessing only large, synchronous read requests and another queue as containing small low-priority writes. The host 50 can also mark a queue as containing pre-fetch data, indicating that the read operations for this data may be delayed without adversely affecting host performance. It should be noted that the NVMe standard specifies priority flags in queues using weighted round-robin (WRR) arbitration, but the NVMe standard does not specify creating queues relating to the command data's characteristics.

Figure 11:
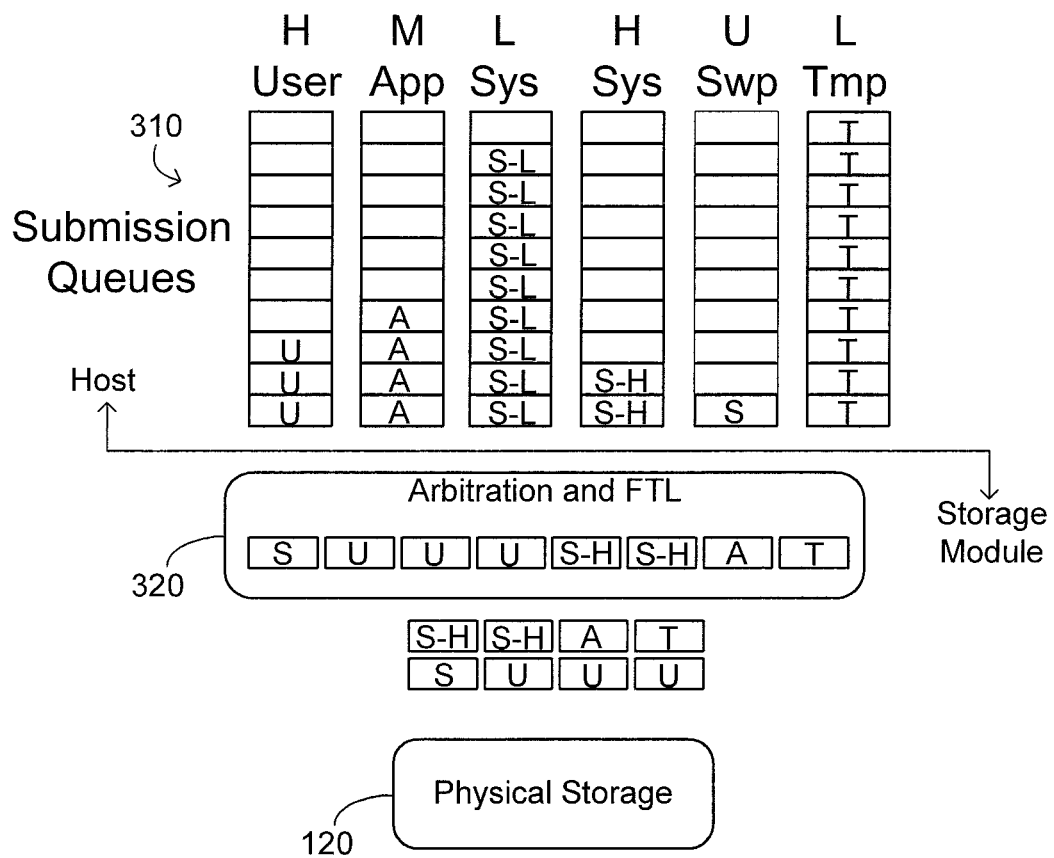
FIG. 11 is a block diagram that illustrates a storage module's use of a submission queue associated with data characteristics.
Figure 12:
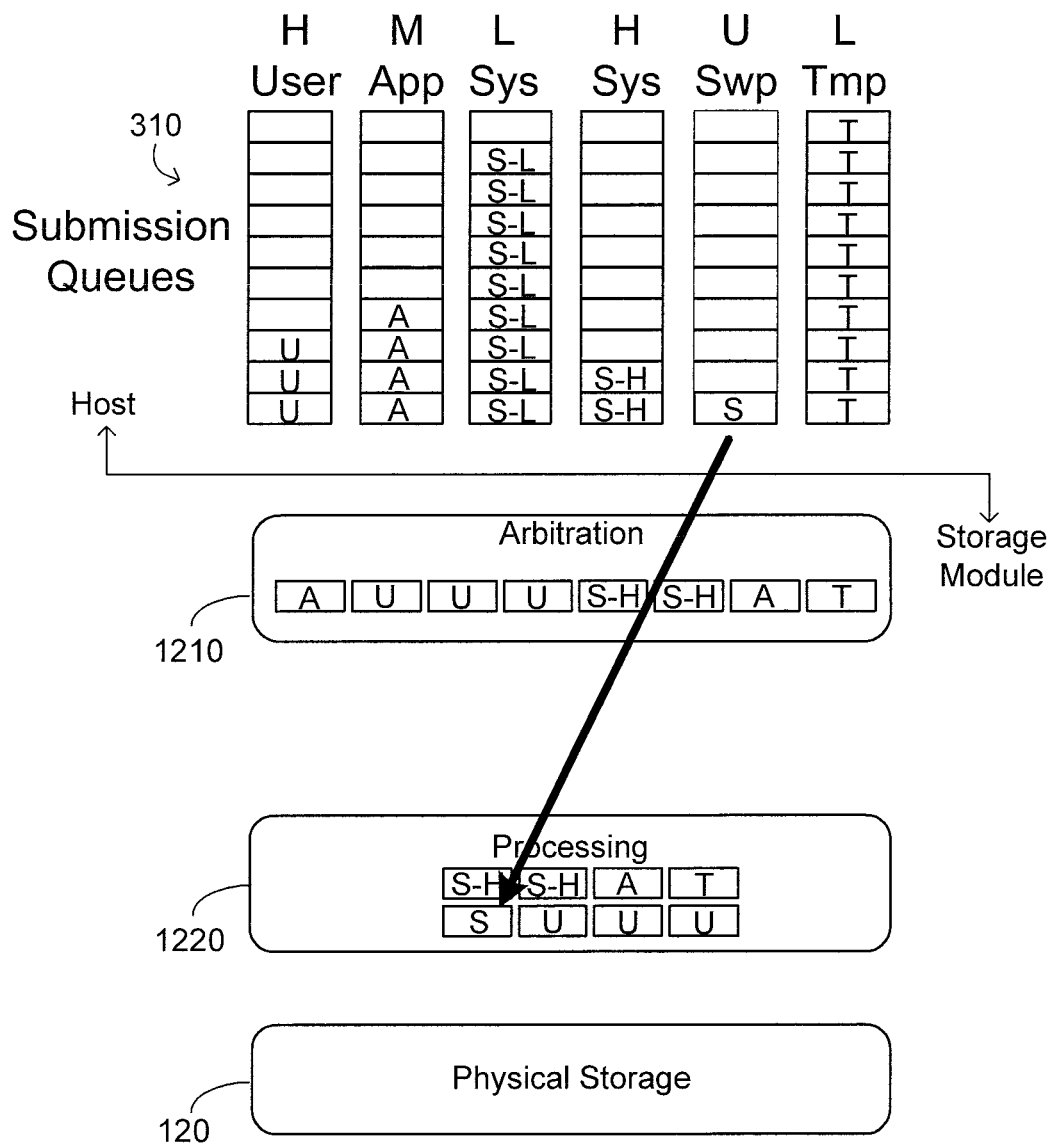
FIG. 12 is a block diagram that illustrates a storage module's use of a submission queue associated with data characteristics when an urgent queue is used.

Irrespective of how the storage module 100 learns for the queue designations, the storage module 100 uses these designations to process commands in the queue according to their data characteristic. This is illustrated in FIG. 11. As shown in FIG. 11, the arbitration and FTL component on the storage module 100 retrieves commands from the host 50 based on the priority levels given to the submission queues based on the data characteristics. So, in the example, the storage module 100 pulls that urgent swap command, three high priority user commands, two high-priority system commands, a medium-priority application command, and a low-priority temporary command from the submission queues 310. The storage module then selects the four highest priority commands to execute in its four channels. FIG. 12 is a variation of this, with the urgent swap command bypassing the arbitration component 1210 and directly going into the processing component for execution.

There are many alternatives that can be used with these embodiments. For example, pre-fetched data read command associated with the BootCache in Mac (or the corresponding SuperFetch subsystem in Windows) can be routed to queues designated with a low priority and marked as pre-fetch. A storage module 100 receiving read command in submission queues will (1) fulfill these commands (return results to the corresponding CQ) only after fulfilling submitted commands in queues of a higher priority and (2) prevent storage-module-level pre-fetched reads on LBAs adjacent to those requested in these queues.

In an additional extension of this concept, the host file systems can be aligned with the use models and the file system drivers can be instructed to utilize the appropriate queues for each type of data. The host file system can tag read/write requests with the appropriate queue based on usage, and the IOKit driver (or Storport driver in Windows) can route the corresponding NVMe commands into the appropriate submission queue. In another variation (using the 9+1 concept), files marked with the Static file attribute are be routed to Queues 1(H,M,L) depending on priority, and files marked with the Greedy or Temporary file attribute would be routed to Queues 3(H,M,L). (Static and Greedy attributes are concepts defined in the OS X 10.9 kernel. Temporary is an attribute defined in the Windows NTFS file system.)

In another variation, the directory trees corresponding to each queue set (1, 2, and 3) are mounted as a separate file system, and each file system has its own high, medium, and low priority host queues, which would map to the corresponding storage module queues. For example, in a OS X environment, the /Applications, /Library, and root directory would be in one file system, while /Users would be in a second file system, and /private would be in a third file system. In a Windows environment, the \Program Files, \Windows, and root directory would be in one file system, while /Users would be in a second file system.

Lastly, the NVMe specification allows for I/O Submission Queues to be created dynamically, up to N number of queues (where N is the maximum supported by the device). Using a Vendor Specific protocol, in addition to the standard Queue creation commands, new commands can be defined to allow the host to dynamically assign characteristics to the Queue to identify to the SSD device the type characteristics of the command data to expect from the queue. These characteristics may result in equivalent Data Set Management attributes being assigned to the LBAs addressed in the queued commands. For example, a set of Write commands submitted to a specific queue may indicate to the device that these will be read in the future in the same sequence in which they were written. In another example, a set of Read commands submitted to a single queue may indicate that these reads form a dynamic library cache which is read frequently in a specific sequence and never modified.

In another example, a set of Write commands submitted to a specific queue may indicate that all of the writes comprise a single extent of a media file, which will be read in sequence and trimmed as a group. This sequence may also indicate the expected lifetime of the queued writes. (It should be noted that the dataset management attributes defined in the NVMe 1.1 specification do not indicate expected lifetime beyond a "write prepare" flag.)

When the host 50 uses the queue, it indicates to the storage module 100 via an NVMe doorbell that new data has been added to the Queue. The storage module 100 can use this doorbell information to determine which queue should be serviced based on the characteristics of the various queues active. This approach is different from the currently specified behavior of NVMe which is primarily priority based or simply uses round robin arbitration.

In another alternative, specific NAND types are associated with writes to each queue, tuned to the expected characteristics of the data being written in each case. For example, NAND flash tuned to lower retention and higher write performance would be used if available for data being written from a high-priority boot/swap write queue. So, a storage module 100 supporting 9+1 submission queues and receiving a write command in queue 3H may route this write to a pool of available flash memory tuned to short retention and high performance. A storage module 100 (supporting 9+1 submission queues) receiving write commands in queues 1(H,M,L) may route these writes to a pool of available flash memory tuned to long retention with a low number of write cycles.

Also, a storage module 100 may delay garbage collection when outstanding commands are waiting in high priority queues designated for write commands, such as a queue designated for synchronous writes. Similarly, a storage module 100 may execute high priority or synchronous read commands in an out-of-order manner, while delaying lower-priority command execution until after maintenance is complete. A storage module 100 may also take into account the current state of NAND and the cost of pending write commands in various prioritized queues. Similarly, if the storage module 100 detects that it has many outstanding read commands in medium/high priority queues, it may defer garbage collection until the queues are empty. The storage module 100 may defer writes of low or medium priority from designated queues in the same manner.

In another variation, a vendor specific arbitration mechanism is operative to allow the host 50 to dynamically indicate to the storage module 100 the relative weighting of queues that have the same priority. The arbitration mechanism may also indicate the length of the corresponding host queue prior to coalescing, optimum queue depth from the device perspective, and host-side throttling status on a queue-by-queue basis. The arbitration mechanism may be based on scheduling systems similar to the Completely Fair Scheduler, which takes into account the relative cost of each operation rather than the number of atomic operations in each queue.

There are several advantages associated with these embodiments. For example, routing read/write requests into these queues segregates different read and write patterns (applications are typically read sequentially, while user data is written in small chunks). These embodiments also allow partitioning by queue and core on a process level, improving host and device performance. (Prefetching and log output are generally driven by different processes.) Additionally, these embodiments allow for queue timing to be controlled in a more granular way without risking incoherent reads/writes, since the actual data types are independent. Also, these embodiments allow separate asynchronous/background reads from high priority reads which gate responsiveness and prioritize those reads for which a user application may be stalled waiting for. This enables a perceived increase in performance without changing the underlying storage architecture. Further, these embodiments reduce the probability of routine device maintenance operations affecting host performance.

Figure 13:
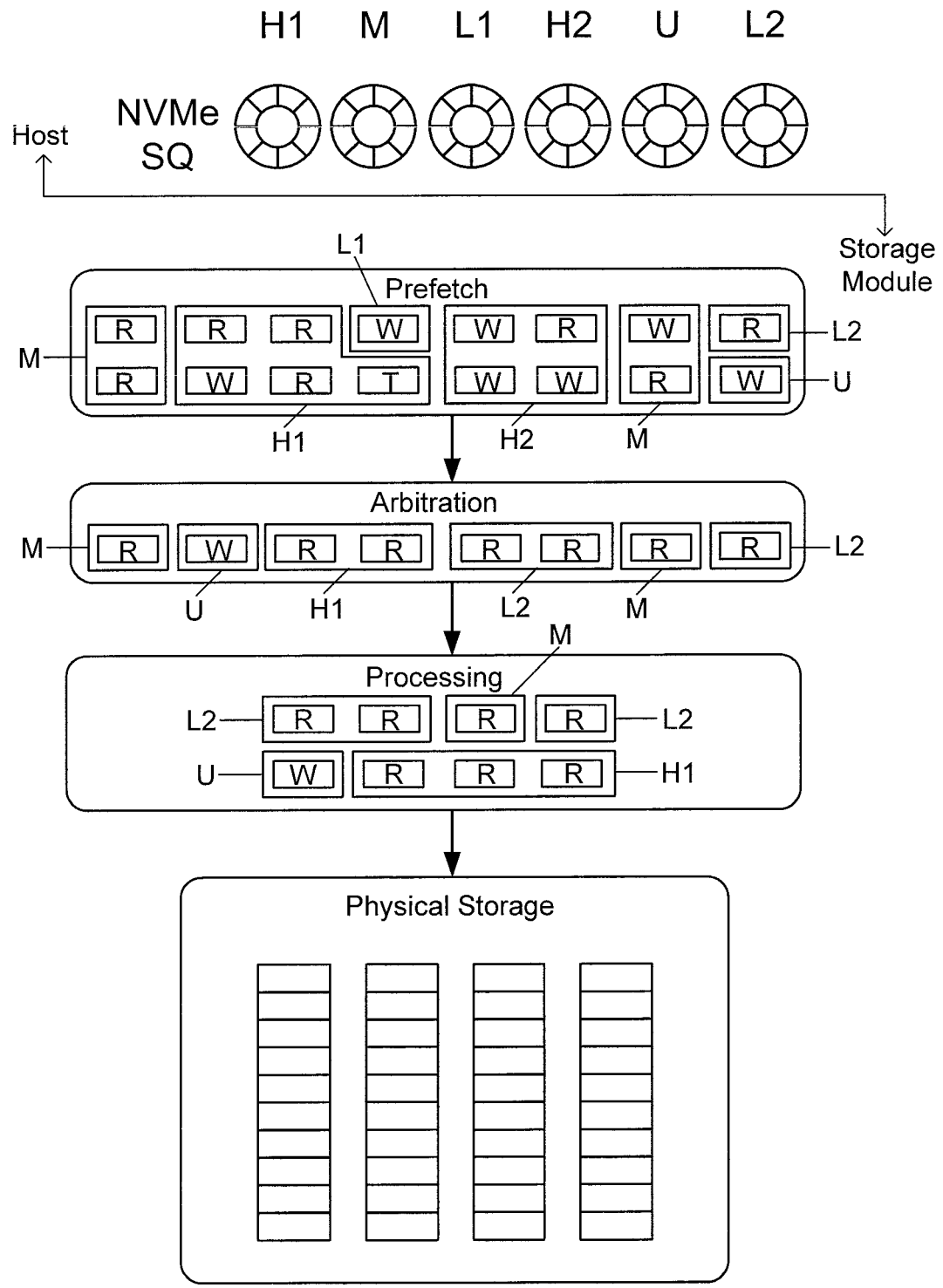
FIG. 13 is a block diagram of an embodiment that illustrates the use of a pre-fetching operation.

In another embodiment, the storage module may pre-fetch items from the submission queues into an internal cache prior to implementing arbitration. This "pre-fetch" operation is shown in FIG. 13. Once a host has added commands onto a submission queue, the host indicates commands have been added to the storage module. The storage module uses these host indications as a way to identify queues that have commands available to process. The storage module can retrieve the commands from the submission queues and store them locally in the storage module before arbitration of queues has been initiated. By pre-fetching commands from the submission queues before arbitration, additional information about the command that was previously unavailable (such as the command type) can be used as a way of determining the best order to execute queued commands Using the command type, along with the queue priority, can greatly improve the arbitration mechanism used within the storage module.

Figure 14:
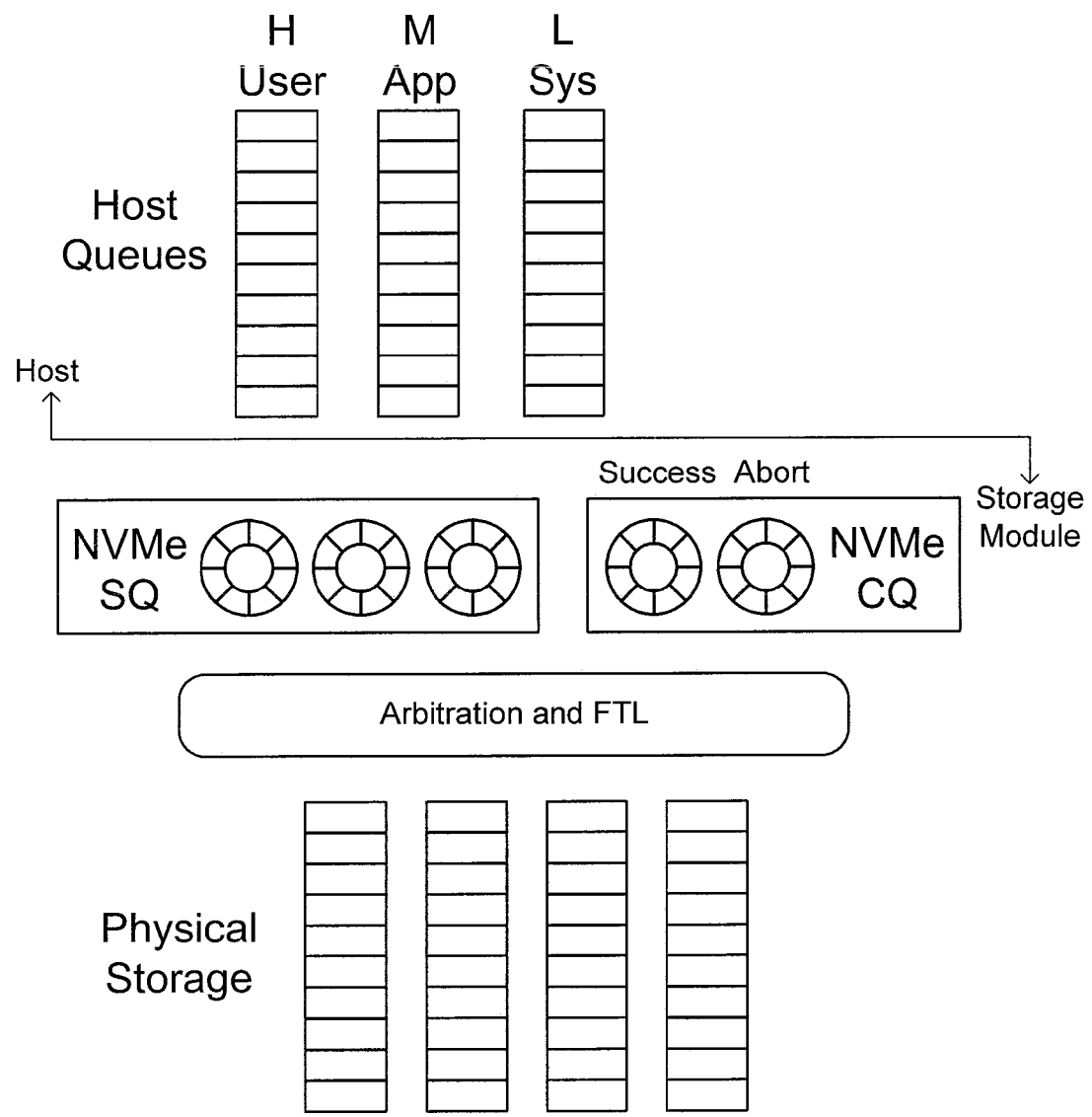
FIG. 14 is a block diagram that illustrates the use of submission queues and completion queues whereby the completion queues are associated with a particular completion status.

In yet another embodiment, which is shown in FIG. 14, the completion queues are associated with a particular completion status. As mentioned above, a completion queues may be present in an embodiment. A completion queue is used to indicate to the host that a previously-submitted command to a submission queue has completed. The completion queues may be paired with one or more submission queues. Similarly, a completion queue may be created with an associated completion status known to both host and storage module. Therefore, when a completed command's status is added to a completion queue, the host has immediate visibility into the completion status. The benefit of assigning a completion status to a particular completion queue is that error conditions and/or other conditions such as retry conditions can be immediately handled without the overhead of having to process other completed command statuses unrelated to the error condition of interest. So, in this alternate embodiment, the storage module generates command completions and sorts them into a plurality of queues based on its resulting status code. The host receives a completion notification indicating one or a plurality of queues contains commands that have been completed by the storage module. Based on the queue containing the completion, the host is able to determine the completion status without the need for the host to review the status information contained within the completion data. By creating queues for particular completion statuses, the host driver can be streamlined to focus only those completions with errors (among other benefits).

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A host comprising:
a memory storing a plurality of commands to be performed in a storage module and a plurality of queues, wherein each command has a respective data characteristic, and wherein each queue is dedicated to commands of a certain data characteristic, whereby because each queue is dedicated to commands of a certain data characteristic, the plurality of queues are dedicated to commands of different data characteristics; and
a controller in communication with the memory and configured to:
sort a plurality of commands into the plurality of queues based on the commands' data characteristics, wherein each command is sorted into a queue that is dedicated to the command's data characteristic irrespective of which thread in the host issued the command;
receive a read request from the storage module for commands in the plurality of queues; and
provide the storage module with the requested commands.

2. The host of claim 1, wherein the queues are submission queues.

3. The host of claim 1, wherein the data characteristics include one or more of the following: sequential access, infrequently-accessed data write, temporary data write, random reads, priority read, and priority write.

4. The host of claim 1, wherein the storage module is embedded in the host.

5. The host of claim 1, wherein the storage module is removably connected to the host.

6. The host of claim 1, wherein the storage module is a solid-state drive.

7. A storage module comprising
a memory; and
a processor in communication with the memory and configured to:
receive a plurality of commands from a host, wherein each command has a respective data characteristic, wherein the host stores the plurality of commands in a plurality of queues, wherein each queue is dedicated to commands of a certain data characteristic, whereby because each queue is dedicated to commands of a certain data characteristic, the plurality of queues are dedicated to commands of different data characteristics, and wherein each command is sorted into a queue that is dedicated to the command's data characteristic irrespective of which thread in the host issued the command; and process the commands using a priority system based on data characteristics of the queues storing the commands.

8. The storage module of claim 7, wherein the queues are submission queues.

9. The storage module of claim 7, wherein the data characteristics include one or more of the following: sequential access, infrequently-accessed data write, temporary data write, random reads, priority read, and priority write.

10. The storage module of claim 7, wherein the processor is further configured to pre-fetch the plurality of commands prior to processing them.

11. The storage module of claim 7, wherein the storage module is embedded in the host.

12. The storage module of claim 7, wherein the storage module is removably connected to the host.

13. The storage module of claim 7, wherein the storage module is a solid-state drive.

14. A storage module comprising
a memory; and
a processor in communication with the memory and configured to:
generate a plurality of completions; and
submit the plurality of completions to a plurality of queues in a host, wherein a completion is sorted into a queue based on its status, wherein each queue is dedicated to commands of a certain data characteristic, whereby because each queue is dedicated to commands of a certain data characteristic, the plurality of queues are dedicated to commands of different data characteristics, and a command is sorted into a queue that is dedicated to the command's data characteristic irrespective of which thread in the host issued the command.

15. The storage module of claim 14, wherein the queues are completion queues.

16. A method for providing a storage module with requested commands, the method comprising:
performing the following in a host comprising a memory storing a plurality of commands to be performed in a storage module and a plurality of queues, wherein each command has a respective data characteristic, and wherein each queue is dedicated to commands of a certain data characteristic, whereby because each queue is dedicated to commands of a certain data characteristic, the plurality of queues are dedicated to commands of different data characteristics:
sorting a plurality of commands into the plurality of queues based on the commands' data characteristics, wherein each command is sorted into a queue that is dedicated to the command's data characteristic irrespective of which thread in the host issued the command;
receiving a read request from the storage module for commands in the plurality of queues; and
providing the storage module with the requested commands.

17. The method of claim 16, wherein the queues are submission queues.

18. The method of claim 16, wherein the data characteristics include one or more of the following: sequential access, infrequently-accessed data write, temporary data write, random reads, priority read, and priority write.

19. The method of claim 16, wherein the storage module is embedded in the host.

20. The method of claim 16, wherein the storage module is removably connected to the host.

21. The method of claim 16, wherein the storage module is a solid-state drive.

22. A method for processing commands, the method comprising:
performing the following in a storage module comprising a memory:
receiving a plurality of commands from a host, wherein each command has a respective data characteristic, wherein the host stores the plurality of commands in a plurality of queues, wherein each queue is dedicated to commands of a certain data characteristic, whereby because each queue is dedicated to commands of a certain data characteristic, the plurality of queues are dedicated to commands of different data characteristics, and wherein each command is sorted into a queue that is dedicated to the command's data characteristic irrespective of which thread in the host issued the command; and
processing the commands using a priority system based on data characteristics of the queues storing the commands.

23. The method of claim 22, wherein the queues are submission queues.

24. The method of claim 22, wherein the data characteristics include one or more of the following: sequential access, infrequently-accessed data write, temporary data write, random reads, priority read, and priority write.

25. The method of claim 22, wherein the processor is further configured to pre-fetch the plurality of commands prior to processing them.

26. The method of claim 22, wherein the storage module is embedded in the host.

27. The method of claim 22, wherein the storage module is removably connected to the host.

28. The method of claim 22, wherein the storage module is a solid-state drive.

29. A method of submitting a plurality of completions, the method comprising:
performing the following in a storage module comprising a memory:
generating a plurality of completions; and
submitting the plurality of completions to a plurality of queues in a host, wherein a completion is sorted into a queue based on its status, wherein each queue is dedicated to commands of a certain data characteristic, whereby because each queue is dedicated to commands of a certain data characteristic, the plurality of queues are dedicated to commands of different data characteristics; and a command is sorted into a queue that is dedicated to the command's data characteristic irrespective of which thread in the host issued the command.

30. The method of claim 29, wherein the queues are completion queues.

* * * * *